United States Patent
Soled et al.

(10) Patent No.: US 7,776,205 B2
(45) Date of Patent: *Aug. 17, 2010

(54) PROCESS TO UPGRADE HYDROCARBONACEOUS FEEDSTREAMS

(75) Inventors: Stuart L. Soled, Pittstown, NJ (US); Sabato Miseo, Pittstown, NJ (US); Sonja Eijsbouts, Nieuwkuijk (NL)

(73) Assignee: ExxonMobil Research and Engineering Company, Annandale, NJ (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/096,499

(22) Filed: Apr. 1, 2005

(65) Prior Publication Data

US 2005/0236303 A1 Oct. 27, 2005

Related U.S. Application Data

(60) Provisional application No. 60/564,403, filed on Apr. 22, 2004.

(51) Int. Cl.
| | |
|---|---|
| C10G 27/00 | (2006.01) |
| C10G 45/04 | (2006.01) |
| C10G 45/60 | (2006.01) |
| C10G 11/02 | (2006.01) |
| C10G 11/04 | (2006.01) |
| C10G 47/02 | (2006.01) |
| C10G 47/04 | (2006.01) |
| C10G 35/00 | (2006.01) |
| C10G 35/06 | (2006.01) |
| B01J 38/22 | (2006.01) |
| B01J 35/02 | (2006.01) |
| B01J 8/08 | (2006.01) |

(52) U.S. Cl. ............... 208/5; 208/148; 208/216 R; 208/112; 208/121; 208/136; 208/137; 502/45; 422/211

(58) Field of Classification Search ............ 208/5, 208/216 R, 112, 121, 136, 137, 142, 143, 208/148, 149, 243, 244, 249, 295; 502/45; 422/122, 177, 188, 190, 211

See application file for complete search history.

(56) References Cited

U.S. PATENT DOCUMENTS

| | | | |
|---|---|---|---|
| 2,946,738 A | 7/1960 | Gardner et al. | |
| 3,475,324 A * | 10/1969 | Borst, Jr. | 208/111.3 |
| 3,720,602 A | 3/1973 | Riley et al. | |
| 4,344,840 A * | 8/1982 | Kunesh | 208/59 |
| 4,414,102 A | 11/1983 | Rankel et al. | |
| 4,596,785 A | 6/1986 | Toulhoat et al. | |
| 4,769,129 A * | 9/1988 | Barbou des Courieres et al. | 208/215 |
| 5,252,199 A | 10/1993 | Singhal et al. | |
| 5,275,994 A | 1/1994 | Weissman et al. | |
| 5,609,845 A * | 3/1997 | Cimini et al. | 423/648.1 |
| 6,071,402 A | 6/2000 | Danot et al. | |
| 6,156,695 A | 12/2000 | Soled et al. | |
| 6,162,350 A | 12/2000 | Soled et al. | |
| 6,231,750 B1 | 5/2001 | Kasztelan et al. | |
| 6,299,760 B1 | 10/2001 | Soled et al. | |
| 6,432,867 B1 * | 8/2002 | Kasztelan | 502/216 |
| 6,534,437 B2 | 3/2003 | Eijsbouts et al. | |
| 7,374,666 B2 * | 5/2008 | Wachs | 208/208 R |
| 2001/0000006 A1 | 3/2001 | Kasztelan et al. | |
| 2002/0065441 A1* | 5/2002 | Eijsbouts et al. | 585/276 |
| 2002/0117425 A1* | 8/2002 | Knudsen et al. | 208/204 |
| 2002/0148757 A1* | 10/2002 | Huff et al. | 208/213 |
| 2003/0015457 A1* | 1/2003 | Liu et al. | 208/209 |
| 2005/0236304 A1* | 10/2005 | Soled et al. | 208/216 R |
| 2007/0227949 A1 | 10/2007 | Eijsbouts et al. | |

FOREIGN PATENT DOCUMENTS

| | | |
|---|---|---|
| EP | 1029592 A1 | 8/2000 |
| WO | WO 00/41810 | 7/2000 |
| WO | WO 00/42121 A1 * | 7/2000 |

OTHER PUBLICATIONS

Levin, Doron, et al., "Crystal Structure of an Ammonium Nickel Molybdate Prepared by Chemical Precipitation," *Inorganic Chemistry*, 1996, 35, pp. 4191-4197 (Sep. 1995).

Mazzocchia, C., et al., "On the NiO MoO3 mixed oxide correlation between preparative procedures thermal activation and catalytic properties," *Solid State Ionics*, 63-65 (1993) pp. 731-735.

Astier, M.P., et al., "Nickel-molybdenum catalysts prepared by reduction of ammonium triammine tetranickel pentamolybdate," *Applied Catalysis*, 72 (1991) pp. 321-329.

Astier, M.P., et al., "Ammonium Triammine Tetranickel Pentamolybdate Preparation, Characterization and Crystal Structure," *Ann. Chem. Fr.*, 12, pp. 337-343 (1987).

Astier, M.P., et al., "Solid State Chemistry," *C.R. Acad. Sc. Paris,*, 304, (II), No. 11, pp. 563-566 (1987).

* cited by examiner

*Primary Examiner*—Walter D Griffin
*Assistant Examiner*—Natasha Young

(57) ABSTRACT

The instant invention relates to a process to produce liquid products through the hydroprocessing of hydrocarbonaceous feedstreams in the presence of a bulk metal hydroprocessing catalyst.

30 Claims, No Drawings

PROCESS TO UPGRADE HYDROCARBONACEOUS FEEDSTREAMS

CROSS-REFERENCE TO RELATED APPLICATION

This application claims benefit of U.S. Provisional Patent Application Ser. No. 60/564,403 filed Apr. 22, 2004.

FIELD OF THE INVENTION

The instant invention relates to a process for upgrading hydrocarbonaceous feedstreams. More particularly, the instant invention relates to a process to produce liquid products through the hydroprocessing of hydrocarbonaceous feedstreams in the presence of a bulk metal hydroprocessing catalyst.

BACKGROUND OF THE INVENTION

Environmental and regulatory initiatives are requiring ever lower levels of both sulfur and aromatics in distillate fuels. For example, proposed sulfur limits for distillate fuels to be marketed in the European Union for the year 2005 is 50 wppm or less. There are also proposed limits that would require lower levels of total aromatics as well as lower levels of multi-ring aromatics found in distillate fuels and heavier hydrocarbon products. Further, the maximum allowable total aromatics level for CARB reference diesel and Swedish Class I diesel are 10 and 5 vol. %, respectively. Further, the CARB reference fuels allows no more than 1.4 vol. % polyaromatics (PNAs). Consequently, much work is presently being done in the hydrotreating art because of these proposed regulations.

However, as the supply of low sulfur, low nitrogen crudes decreases, refineries are processing crudes with greater sulfur and nitrogen contents at the same time that environmental regulations are mandating lower levels of these heteroatoms in products. Consequently, there is a continuous need for hydrotreating catalysts with improved activity and increasingly efficient diesel desulfurization and denitrogenation processes. For example, at a given final sulfur content, a more active catalyst will make it possible to operate under milder process conditions (energy saving) or to increase the life-span of a catalyst between regenerations (cycle length).

In one approach, a family of compounds, related to hydrotalcites, e.g., ammonium nickel molybdates, has been prepared as catalysts to be used in such processes. Whereas X-ray diffraction analysis has shown that hydrotalcites are composed of layered phases with positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., Crystal Structure of an Ammonium Nickel Molybdate prepared by *Chemical Precipitation, Inorganic Chemistry*, Vol. 35, No. 14, p. 4191-4197 (1996). The preparation of such materials also has been reported by Teichner and Astier, *Appl. Catal.* 72, 321-29 (1991); *Ann. Chim. Fr.* 12, 337-43 (1987), and *C. R. Acad. Sci.* 304 (II), #11, 563-6 (1987) and Mazzocchia, *Solid State Ionics*, 63-65 (1993) 731-35.

In another approach, U.S. Pat. No. 6,071,402 describes a catalyst for the hydrotreating of hydrocarbon feeds which contains mixed sulfides of a Group VIB metal component, a Group V metal component, and optionally a Group VIII metal component. This publication describes massive catalysts comprising 0.01-100%, preferably 0.05% to 100%, more preferably 0.1% to 100%, of at least one mixed sulfide, the catalyst possibly further containing 0 to 99.99%, preferably 0 to 99.95%, more preferably 0 to 99.9%, of at least one group VIII metal. The preferred supported catalyst of this reference generally comprises, in % by weight with respect to the total catalyst mass, 1% to 99.9%, preferably 5% to 99.5%, more preferably 10% to 99%, of at least one matrix material, 0.1% to 99%, preferably 0.5% to 95%, more preferably 1% to 90%, of at least one mixed sulfide of at least one group VB metal and at least one group VIB metal, the catalyst possibly further containing 0 to 30%, preferably 0 to 25%, more preferably 0 to 20%, of at least one group VIII metal. If a Group VIII metal component is present at all in the catalysts of this reference, it is present in limited amounts. More in particular, in Example 7 a catalyst is prepared which contains 0.070 mole of molybdenum, 0.029 mole of niobium, and 0.029 mole of nickel per 100 grams of catalyst. This catalyst has a Mo:Nb:Ni ratio of 2.4:1:1. In the other examples, the amount of Group VIII metal component in relation to the amount of Group VIB and Group V metal components is even lower.

Also, processes to produce fuels to meet the ever more restrictive Environmental regulations, such as hydrotreating, are well known in the art and typically requires treating the petroleum streams with hydrogen in the presence of a supported catalyst at hydrotreating conditions. The catalyst is usually comprised of a Group VI metal with one or more Group VIII metals as promoters on a refractory support. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

However, there still exists a need in the art for an effective, efficient hydroprocessing process for hydrocarbonaceous feedstreams.

SUMMARY OF THE INVENTION

The instant invention is directed at a process for producing liquid products from a hydrocarbonaceous feedstream. The process comprises:

a) contacting a hydrocarbonaceous boiling range feedstream containing aromatics, nitrogen and organically bound sulfur contaminants in a reaction stage with a bulk metal hydroprocessing catalyst in the presence of hydrogen-containing treat gas thereby producing a reaction product comprising at least a vapor product and a liquid product, wherein said hydrocarbonaceous feedstream is contacted with said bulk metal catalyst under effective hydroprocessing conditions and said bulk metal hydroprocessing catalyst comprises:

i) a Group VIB metal component selected from molybdenum, tungsten, and mixtures thereof;
  ii) a Group V metal component selected from vanadium, niobium, tantalum, and mixtures thereof; and
  iii) a Group VIII metal component selected from nickel, cobalt, iron, and mixtures thereof, wherein the metal components (calculated as oxides) comprise at least 50 wt. % of the catalyst, wherein the molar ratio between the metal components satisfies the formula (Group VIB+Group V):(Group VIII)=0.35-2:1.

In one embodiment of the instant invention, said process further comprises:

b) separating said vapor product from said liquid product; and c) recovering said liquid product.

In one embodiment of the instant invention, said effective hydroprocessing conditions are hydrotreating conditions effective at removing at least a portion of said nitrogen and organically bound sulfur contaminants and hydrogenating at least a portion of said aromatics, thus producing at least a liquid product having a lower concentration of aromatics and nitrogen and organically bound sulfur contaminants than the hydrocarbonaceous feedstream.

DETAILED DESCRIPTION OF THE INSTANT INVENTION

It should be noted that the terms "bulk" and "unsupported" when used in conjunction with the hydroprocessing catalysts disclosed herein are synonymous and are sometimes used interchangeably.

The present invention involves contacting a hydrocarbonaceous feedstream containing organically bound sulfur contaminants in a reaction stage with a bulk metal hydroprocessing catalyst. The bulk metal hydroprocessing catalyst comprises a Group VIB metal component selected from molybdenum, tungsten, and mixtures thereof, a Group V metal component selected from vanadium, niobium, tantalum, and mixtures thereof, and a Group VIII metal component selected from nickel, cobalt, iron, and mixtures thereof. The metal components (calculated as oxides) of these bulk metal catalysts comprise at least 50 wt. % of the catalyst, wherein the molar ratio between the metal components satisfies the following formula: (Group VIB+Group V):(Group VIII) =0.35-2:1. The inventors hereof have found that if the Group VIII metal component makes up a specified amount of the total metal components present in the bulk metal catalyst, a catalyst is obtained with an increased activity. The contacting of the hydrocarbonaceous feedstream with the bulk metal hydroprocessing catalyst occurs in the presence of a hydrogen-containing treat gas, and the reaction stage is operated under effective hydroprocessing conditions. The contacting of the hydrocarbonaceous feedstream with the bulk metal hydroprocessing catalyst produces at least a liquid product.

By hydrocarbonaceous feedstream, it is meant a primarily hydrocarbon material obtained or derived from crude petroleum oil, from tar sands, from coal liquefaction, shale oil and hydrocarbon synthesis. Thus, hydrocarbonaceous feedstreams suitable for use in the present invention include those feedstreams boiling from the naphtha boiling range to heavy feedstocks, such as gas oils and resids, and also those derived from Fischer-Tropsch processes. Typically, the boiling range will be from about 40° C. to about 1000° C. Non-limiting examples of suitable feedstreams include vacuum gas oils; distillates including naphtha, diesel, kerosene, and jet fuel; heavy gas oils, raffinates, lube oils, etc.

Hydrocarbonaceous boiling range feedstreams suitable for use in the present invention include, among other things, nitrogen and sulfur contaminants. Typically, the nitrogen content of such streams is about 50 to about 1000 wppm nitrogen, preferably about 75 to about 800 wppm nitrogen, and more preferably about 100 to about 700 wppm nitrogen. The nitrogen appears as both basic and non-basic nitrogen species. Non-limiting examples of basic nitrogen species may include quinolines and substituted quinolines, and non-limiting examples of non-basic nitrogen species may include carbazoles and substituted carbazoles. The sulfur content of the hydrocarbonaceous boiling range feedstream will generally range from about 50 wppm to about 7000 wppm, more typically from about 100 wppm to about 5000 wppm, and most typically from about 100 to about 3000 wppm. The sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. The hydrocarbonaceous feedstreams suitable for use herein also contain aromatics, which are typically present in an amount ranging from about 0.05 wt. % to about 2.5 wt. %, based on the hydrocarbonaceous boiling range feedstream.

As stated above, the present invention involves contacting a hydrocarbonaceous feedstream with a bulk metal hydroprocessing catalyst in the presence of a hydrogen-containing treat gas in a reaction stage operated under effective hydroprocessing conditions. The term "hydroprocessing" as used herein is used herein to designate a catalytic process conducted in the presence of hydrogen. Non-limiting examples of hydroprocessing processes which can be practiced by the present invention include the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of aromatics; the hydroisomerization and/or catalytic dewaxing of waxes, particularly Fischer-Tropsch waxes; and demetallation of heavy streams. Ring-opening, can also be considered a hydroprocessing process. Thus, "effective hydroprocessing conditions" are to be considered those conditions that when selected achieve the desired result of the hydroprocessing process. For example, effective hydroisomerization and/or catalytic dewaxing conditions are to be considered those conditions that, when selected, achieve the desired degree of dewaxing to produce the desired product. In a preferred embodiment, the effective hydroprocessing conditions are effective hydrotreating conditions. Thus, in this embodiment the effective conditions are to be considered those conditions under which the hydrocarbonaceous feedstock is hydrotreated and hydrogenated, more specifically when heteroatoms are removed and when at least a portion of the aromatic fraction of the feedstock is hydrogenated. These conditions typically include temperatures ranging from about 150° C. to about 425° C., preferably about 200° C. to about 370° C., more preferably about 230° C. to about 350° C. Typical weight hourly space velocities ("WHSV") range from about 0.1 to about 20 $hr^{-1}$, preferably from about 0.5 to about 5 $hr^{-1}$. Any effective pressure can be utilized, and pressures typically range from about 4 to about 70 atmospheres, preferably 10 to 40 atmospheres.

Hydrogen-containing treat gasses suitable for use in the presently disclosed process can be comprised of substantially pure hydrogen or can be mixtures of other components typically found in refinery hydrogen streams. It is preferred that the hydrogen-containing treat gas stream contains little, more preferably no, hydrogen sulfide. The hydrogen-containing treat gas purity should be at least about 50% by volume hydrogen, preferably at least about 75% by volume hydrogen, and more preferably at least about 90% by volume hydrogen for best results. It is most preferred that the hydrogen-containing stream be substantially pure hydrogen.

As stated above, in the practice of the present invention, the above-described hydrocarbonaceous feedstream is contacted with a bulk metal hydroprocessing catalyst in a reaction stage.

The reaction stage can be comprised of one or more reactors or reaction zones each of which can comprise one or more catalyst beds of the same or different bulk metal hydroprocessing catalyst described above. Although other types of catalyst beds can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed. A portion of the heat generated during hydroprocessing can be recovered. Where this heat recovery option is not available, conventional cooling may be performed through cooling utilities such as cooling water or air, or through use of a hydrogen quench stream. In this manner, optimum reaction temperatures can be more easily maintained.

Bulk metal hydroprocessing catalysts suitable for use herein comprise a Group VIB metal component selected from molybdenum, tungsten, and mixtures thereof, a Group V metal component selected from vanadium, niobium, tantalum, and mixtures thereof, and a Group VIII metal component selected from nickel, cobalt, iron, and mixtures thereof. The metal components (calculated as oxides) of the bulk metal hydroprocessing catalyst comprise at least 50 wt. % of the catalyst, and the bulk metal hydroprocessing catalyst is further characterized in that the molar ratio between the metal components satisfies the formula (Group VIB+Group V):(Group VIII)=0.35-2:1. It is preferred that molybdenum and/or tungsten make up at least 50 mole % of the total of Group VIB metals, more preferably at least 70 mole %, still more preferably at least 90 mole %. It may be especially preferred for the Group VIB metal to consist essentially of molybdenum and/or tungsten. It is preferred that niobium and/or vanadium make up at least 50 mole % of the total of Group V metals, more preferably at least 70 mole %, still more preferably at least 90 mole %. It may be especially preferred for the Group V metal to consist essentially of niobium and/or vanadium. It is preferred that nickel and/or cobalt make up at least 50 mole % of the total of Group VIII non-noble metals, more preferably at least 70 mole %, still more preferably at least 90 mole %. It may be especially preferred for the Group VIII non-noble metal to consist essentially of nickel and/or cobalt. The use of nickel alone as Group VIII metal component is particularly preferred.

Thus, preferred catalyst compositions according to the invention include a catalyst composition wherein the metals components consist essentially of molybdenum, nickel, and vanadium, a catalyst composition wherein the metal components consist essentially of molybdenum, nickel, and niobium, a catalyst composition wherein the metals components consist essentially of tungsten, nickel, and vanadium, and a catalyst composition wherein the metal components consist essentially of tungsten, nickel, and niobium. It should be noted that in the context of the present specification the wording "consists essentially of" and "consisting essentially of" mean that the composition in question contains the cited components, but may contain contaminant metals the presence of which cannot reasonably be avoided.

The molar ratio of the metal components in the catalyst according to the invention satisfies the formula (Group VIB+Group V):(Group VIII)=0.35-2:1. Preferably the ratio between the total molar amount of Group VIB and Group V metal and the molar amount of Group VIII metal is at least 0.5:1, more preferably at least 0.6:1, still more preferably at least 0.75:1. The ratio between the total molar amount of Group VIB and Group V metal and the molar amount of Group VIII metal is preferably at most 1.5:1. If the total molar amount of Group VIB and Group V metal is too high in relation to the molar amount of Group VIII metal, the activity of the catalyst will be insufficient. If the total molar amount of Group VIB and Group V metal is too low in relation to the molar amount of Group VIII metal, or, in other words, the amount of Group VIII metal component is too high, the performance of the catalyst will also be inadequate. Operation within the most preferred ranges gives catalysts with a higher activity than catalysts with a composition within the less preferred ranges. The molar ratio of Group VIB metals to Group V non-noble metals in the catalyst of the invention generally ranges from 10:1-1:10 and preferably from 3:1-1:3.

The bulk metal hydroprocessing catalysts suitable for use herein comprise at least 50 wt. % metal components, calculated as oxides, based on the total weight of the catalyst composition, preferably, at least 70 wt. %, more preferably at least 80 wt. %, still more preferably at least 90 wt. %, calculated as oxides. In calculating the wt. % of the metals as oxides, the Group VIB metals are calculated as trioxides, the Group VIII metals are calculated as mono-oxides, and the Group V metals are calculated as pentoxides (for example $Nb_2O_5$ and $V_2O_5$). The amount of Group VIB metals, Group V metals, and Group VIII non-noble metals can be determined via AAS or ICP on the catalyst after calcination in air at 500° C.

In addition to the metal components discussed above, the bulk metal catalyst composition according used in the present invention can also comprise conventional catalyst components like binders or carrier materials, cracking components, conventional hydroprocessing catalysts, etc. Non-limiting examples of suitable binders and carrier materials include silica, silica-alumina, alumina, titania, titania-alumina, zirconia, boria, cationic clays or anionic clays such as saponite, bentonite, kaolin, sepiolite or hydrotalcite, and mixtures thereof. Preferred components are silica, silica-alumina, alumina, titania, titania-alumina, zirconia, bentonite, boria, and mixtures thereof, with silica, silica-alumina, and alumina being especially preferred. Non-limiting examples of suitable cracking components include crystalline cracking components such as zeolites, e.g., ZSM-5, (ultra-stable) zeolite Y, zeolite X, ALPOs, SAPOs, MCM-41, amorphous cracking components such as silica-alumina, and mixtures thereof. It should be noted that some materials, e.g., silica-alumina, may act as binder and cracking component at the same time. If so desired, the catalyst composition may comprise any further materials such as phosphorus-containing compounds, boron-containing compounds, silicon-containing compounds, fluorine-containing compounds, additional transition metals, rare earth metals, or mixtures thereof.

The bulk metal hydroprocessing catalysts used in the present invention can be formed into many different shapes. Non-limiting examples of suitable shapes include powders, spheres, cylinders, rings, and symmetric or asymmetric polylobes, for instance tri- and quadrulobes. Particles resulting from extrusion, beading or pelleting usually have a diameter in the range of 0.2 to 10 mm, and their length likewise is in the range of 0.5 to 20 mm. These particles are generally preferred. Powders, including those resulting from, e.g., spray-drying generally have a median particle diameter in the range of 1 μm-100 μm, but deviations from this general range are possible.

The bulk metal hydroprocessing catalysts suitable for use in the present invention are sulfur-containing catalysts. The sulfur may be present in the catalyst in many forms, for example, in whole or in part in the form of metal sulfides. It may also be present in whole or in part in the form of a sulfur compound not bound to the metal components. In this case, the sulfur will be converted into metal sulfides during use of the catalyst in hydrotreating or during a preceding reduction/activation step in the presence of hydrogen. The sulfur content of the bulk metal catalysts used herein is generally at least 8 wt. %, more preferably at least 15 wt. %, still more preferably at least 20 wt. %. The sulfur content of the bulk metal catalysts used herein is generally less than 70 wt. %, preferably less than 60 wt. %, depending on the bulk metal catalyst composition. The total amount of sulfur present in the bulk metal catalyst suitable for use in the present invention is generally selected to correspond to 70-200%, more preferably 80-150%, of the stoichiometric sulfur quantity necessary to convert the hydrogenation metals into $MoS_2$, $WS_2$, CrS, $Co_9S_8$, $Ni_3S_2$, FeS, $NbS_2$, VS, and $TaS_2$ respectively.

As will be evident to the skilled person, when the catalyst according to the invention is used in the hydroprocessing of hydrocarbon feeds, the metal components will be present in the sulfided form. A preferred embodiment of the present invention is therefore a catalyst wherein at least part of the metal components are present in the sulfided form. In this case, it is preferred for the catalyst to be essentially free from Group VIII non-noble metal disulfides. The Group VIII non-noble metals are preferably present as (Group VIII non-noble metal)$_a S_b$ with a/b being in the range of 0.5-1.5, as can be determined by, e.g., XRD. Molybdenum and tungsten are preferably at least partly present in the sulfided catalyst as disulfides, as can be determined by, e.g., XRD. Chromium, if present, is preferably at least partly present as sulfide (CrS or $Cr_2S_3$), as can be determined by, e.g., XRD. The Group V metal component is preferably at least partly present as $NbS_2$, $V_2S_5$, and $TaS_2$, respectively.

As indicated above, the sulfur in the bulk metal catalysts suitable for use in the present invention may also be present, in the form of a sulfur compound not bound to the metal components of the catalyst. It may, for example, be present, in whole or in part, in the form of elemental sulfur, in the form of organic sulfur compounds, or in the form of inorganic sulfur compounds which are not sulfides of the metals of Group VI, Group V, and Group VIII metal components. In the latter case, the sulfur-containing catalyst may be subjected to an activation step to convert the metal components at least partly into their sulfides. The activation step generally comprises contacting the catalyst with hydrogen at a temperature of 100-600° C. for an adequate period of time. Such an activation step can be carried out ex situ, that is, outside the hydroprocessing unit in which the catalyst will be used, or in situ, that is, in the hydroprocessing unit in which the catalyst will be used.

As mentioned above, within the group of sulfur compounds that can be present in the catalysts suitable for use herein are sulfur compounds that are not yet bound to the metal compound in the form of a metal sulfide. Preferred sulfur compounds include organic compounds having at least one mercapto-group. Within the group of mercapto-compounds, mercaptocarboxylic acids represented by the general formula HS—R1-COOR, wherein R1 stands for a divalent hydrocarbon group with 1-10 carbon atoms and R stands for a hydrogen atom, an alkali metal, an alkaline earth metal, ammonium, or a linear or branched alkylgroup having 1 to 10 carbon atoms. Non-limiting examples within this group include mercaptoacetic acid (HS—CH2-COOH), beta-mercaptoprioprionic acid (HS—CH2CH2-COOH), methylmercaptoacetate (HS—CH2-COOCH3), ethyl 2-mercaptoacetate (HS—CH2-COOC2H5), ethylhexyl mercaptoacetate (HS—CH2-COOC8H17), and methyl 3-mercaptoproprionate ((HS—CH2CH2-COOCH3). Other compounds preferred within the group of mercapto-compounds include aminosubstituted mercaptanes represented by the general formula H2N—R2-SH, wherein R2 stands for a divalent hydrocarbon group having 1-15 carbon atoms. Examples of these compounds include 2-amino ethanethiol (H2N—CH2CH2-SH), and 4-amino thiophenol (H2N—C6H4-SH). Additional compounds within the group of mercapto-compounds are the dimercaptanes represented by the general formula HS—R3-SH, wherein R3 stands for a divalent hydrocarbon group having 1-15 carbon atoms. Examples of these compounds include ethanedithiol (HS—CH2CH2-SH) and 1,4-butanedithiol (HS—(CH2)4-SH).

Preferred sulfur compounds also include thioacids of the formula R4-COSH, wherein R4 stands for a monovalent hydrocarbon group having 1-15 carbon atoms. Examples of these compounds include thioacetic acid (CH3-COSH) and thiobenzoic acid (C6H5COSH). Dithioacids of the formula HSOC—R5-COSH, wherein R5 is a divalent hydrocarbon group with 1-15 carbon atoms may also be suitable. An example is dithioadipic acid (HSOC—C4H10-COSH). Also preferred within the group of sulfur compounds are those sulfur compounds that include mercaptoalcohols of the general formula R6S—R5-(OH)n, wherein R5 represents an alkyl group having from 1 to 15 carbon atoms or a phenyl group, R6 represents a hydrogen atom or an alkyl group having 1 or 2 carbon atoms, and n is 1 or 2. Non-limiting examples of these compounds include 2-mercaptoethanol, 2-(methylthio)ethanol, 2-(ethylthio)ethanol, 3-mercapto-2-butanol, 4-mercaptophenol, 2-(methylthio)phenol, 4-(methylthio)phenol, 2-(ethylthio)phenol, 3-mercapto-1,2, propanediol, 3-methylthio-1,2, propanediol, and 3-ethylthio-1,2, propanediol. Other suitable sulfur compounds include sulfoxides of the formula R7-SO—R8, wherein R7 and R8 are hydrocarbon groups with 1-5 carbon atoms. An example is dimethyl sulfoxide (CH3-SO—CH3).

Ammonium thiocyanate and thiourea may also be present in the bulk metal catalysts suitable for use in the present invention compounds, as may be the various dithiocarbamic acids and the salts thereof, such as ethylene bisdithiocarbamic acid and its salts, and dimethyl dithiocarbamic acid and its salts. Other suitable compounds include mercaptodiathiazoles and their salts, such as 2,5-dimercapto-1,3,4-diathiazoles and its salts.

Other sulfur-containing compounds which may be present in the bulk metal catalysts used herein are polysulfides of the formula R9-Sx-R10, wherein x is a value of 1-15 and R9 and R10 are alkyl groups, preferably branched alkyl groups, with 1-30 carbon atoms. Related compounds are those with the formula HO—R11-Sx-R12-OH, wherein x is a value of 1-15 and R11 and R12 are alkyl groups with 1-8 carbon atoms.

Additional sulfur compounds include elemental sulfur and inorganic sulfur compounds like $(NH_4)_2S_x$.

The bulk metal hydroprocessing catalysts used herein can be prepared by any methods known in the catalyst art for forming bulk metal catalysts. The preferred methods of making the catalyst compositions used herein are described in more detail in U.S. Pat. Nos. 6,156,695, 6,534,437, 6,162,350, 6,299,760, and PCT published application WO 00/41810, which are incorporated herein by reference for all purposes to the extent that they are not inconsistent with the present invention disclosure and claims. The bulk metal hydrotreating catalyst is preferably sulfided prior to use, and most preferably made by the methods outlined in U.S. Pat. Nos. 6,534,437 and 6,162,350.

A more preferred method of preparing the bulk metal hydroprocessing catalyst composition suitable for sue herein comprises combining, sequentially, or simultaneously, a component of a Group VIB metal selected from molybdenum, tungsten, and mixtures thereof, a component of a Group V metal selected from vanadium, niobium, tantalum, and mixtures thereof, a component of a Group VIII metal selected from nickel, cobalt, iron, and mixtures thereof, and a sulfur compound. It should be noted that it is possible to combine all these components in a single step. It should likewise be noted that it is also possible to combine the sulfur compound with one or more of the metal compounds and then combine the resulting product with the other metal compounds. However, sulfide-containing materials must be handled in an inert atmosphere to prevent oxidation. Therefore, in a preferred embodiment of preparing the bulk metal hydroprocessing catalysts suitable for use herein, at least one component of a Group VIB metal, at least one component of a Group V metal, and at least one component of a Group VIII metal are combined in a first step to form an oxygen-stable product. The oxygen-stable product is then combined with a sulfur compound.

There are various ways in which a component of a Group VIB metal, a component of a Group V metal, and a component of a Group VIII metal may be combined. In a first process, the metal components are combined and reacted in the presence of a protic liquid, after which the resulting composition is isolated and dried. Any protic liquid which does not interfere with the reaction may be used. Suitable liquids include water, carboxylic acids, lower alcohols such as ethanol and propanol and mixtures thereof. The use of water is preferred.

In the forming of the hydroprocessing catalysts suitable for use in the present invention, the at least three metal components, namely at least one Group VIII metal component, at least one Group VIB metal component and at least one Group V metal component may be in the solute state or at least partly in the solid state during the process of the invention. Thus, the reaction may involve three solute components, two solute components and one at least partly solid component, one solute component and two at least partly solid components, and three at least partly solid components. The reaction may involve precipitation and, depending on the state of the various components, also dissolution and re-precipitation.

Generally, there are two possible ways of contacting the metal components of the bulk metal catalysts used herein with one another. One way involves combining and reacting the metal components in solution to form a precipitate (hereinafter designated as the "solution route"). While another way comprises combining and reacting the metal components in the presence of a protic liquid with at least one of the metal components remaining at least partly in the solid state (hereinafter designated as the "solid route").

In the solution route, the metal components are completely dissolved when they are combined and/or reacted to form a precipitate. It is possible, for example, to combine the metal components when they are already in the dissolved state and then have them react to form a precipitate. However, it is also possible to combine one or more of the metal components that are partly or entirely in the solid state with further metal components while ensuring that the metal components that are partly or entirely in the solid state will dissolve when present in the reaction mixture. In other words, at least once during the solution route process, all metal components must be present wholly as a solution.

The precipitation of the catalyst particles can be effected by, for example, a) changing the pH during or after combination of the metal component solutions to such a value that precipitation is induced;
b) adding a complexing agent during or after combination of the metal component solutions, which complexing agent forms a complex with one or more of the metals to prevent precipitation of the metals, and thereafter changing the reaction conditions, such as temperature or pH, such that the complexing agent releases the metals for precipitation;
c) adjusting the temperature during or after combination of the metal component solutions to such a value that precipitation is induced;
d) lowering the amount of solvent during or after combination of the metal component solutions such that precipitation is induced;
e) adding a non-solvent during or after combination of the metal component solutions to induce precipitation thereof, with a non-solvent, meaning that the precipitate is essentially insoluble in this solvent;
f) adding an excess of either of the components to such an extent that precipitation is induced.

The pH in, for example, options a) or b) can be adjusted by adding a base or an acid to the reaction mixture. However, it is also possible to add compounds, which upon an increase in temperature, will decompose into hydroxide ions or $H^+$ ions, which increase and decrease the pH, respectively. Non-limiting examples of compounds that will decompose with an increase in temperature, and thereby increase or decrease the pH of the solution, are urea, nitrites, ammonium cyanate, ammonium hydroxide, and ammonium carbonate.

The solid route of forming catalyst suitable for use in the present invention comprises combining and reacting the metal components under conditions such that at least one of the metal components remains at least partly in the solid state. More in particular, it comprises adding the metal components to one another and simultaneously and/or thereafter reacting them. Consequently, in the solid route at least one metal component is added at least partly in the solid state and this metal component remains at least partly in the solid state during the entire reaction. The term "at least partly in the solid state" as used herein means that at least part of the metal component is present as a solid metal component and, optionally, another part of the metal component is present as a solution in the protic liquid. A typical example of this is a suspension of a metal component in a protic liquid, where the metal is at least partly present as a solid, and optionally partly dissolved in the protic liquid. Thus, it is possible to first prepare a suspension of a metal component in the protic liquid and to add, simultaneously or successively, solution(s) and/or further suspension(s) comprising metal component(s) dissolved and/or suspended in the protic liquid. It is also possible to first combine solutions either simultaneously or successively and to subsequently add further suspension(s) and optionally solution(s) either simultaneously or successively.

As long as at least one metal component is at least partly in the solid state during the solid route, the number of metal components that are at least partly in the solid state is not critical. Thus, it is possible for all metal components to be combined in the solid route to be applied at least partly in the solid state. Alternatively, a metal component that is at least partly in solid state can be combined with a metal component that is in the solute state. For example, one of the metal components is added at least partly in the solid state and, e.g., at least two and preferably two metal components are added in the solute state. In another embodiment, for example, two metal components are added at least partly in the solid state and at least one and preferably one metal component is added in the solute state. It should be noted that a metal component is added "in the solute state" means that the whole amount of this metal component is added as a solution in the protic liquid.

As will be clear from the above, it is possible to add the Group VIII metal component, the Group V metal component, and the Group VIB metal component in various ways, at various temperatures and pHs, in solution, in suspension, wetted or as such, simultaneously or sequentially. It should be noted that it is preferred not to employ sulfide-containing metal components during the combining of the metal components, as these components and the resulting products are not stable in the presence of oxygen. This instability implies that all process steps subsequent to the addition of this metal component, even those at a lower temperature, will have to be carried out under an inert atmosphere if resulfiding of the material is to be avoided.

Suitable water-soluble Group VIII metal components to be used in the preparation of the catalysts suitable for use herein include salts, such as nitrates, hydrated nitrates, chlorides, hydrated chlorides, sulfates, hydrated sulfates, formates, acetates, or hypophosphite. Suitable water-soluble nickel and cobalt components include nitrates, sulfates, acetates, chlorides, formates or mixtures thereof as well as nickel hypophosphite. Suitable water-soluble iron components include iron acetate, chloride, formate, nitrate, sulfate or mixtures thereof. Suitable water-soluble Group VIB metal components include Group VIB metal salts such as ammonium or alkali metal monomolybdates and tungstates as well as water-soluble isopoly-compounds of molybdenum and tungsten, such as metatungstic acid, or water-soluble heteropoly compounds of molybdenum or tungsten comprising further, e.g., P, Si, Ni, or Co or combinations thereof. Suitable water-soluble isopoly- and heteropoly compounds are given in *Molybdenum Chemicals*, Chemical data series, Bulletin Cdb-14, February 1969, and in *Molybdenum Chemicals*, Chemical data series, Bulletin Cdb-12a-revised, November 1969. Suitable water-soluble chromium compounds include chromates, isopolychromates and ammonium chromium sulfate. Suitable water-soluble Group V metal components to be used in the process of the invention include water-soluble salts and acids such as vanadium sulfate, vanadium heteropolyacids, niobic acid, NbOCl3, and tantalic acid.

In the preparation of the hydroprocessing catalysts suitable for use herein, if the protic liquid is water, suitable Group VIII metal components which are at least partly in the solid state during the process of the invention comprise Group VIII metal components with a low solubility in water such as citrates, oxalates, carbonates, hydroxy-carbonates, hydroxides, phosphates, phosphides, aluminates, molybdates, tungstates, oxides, or mixtures thereof. Oxalates, citrates, carbonates, hydroxy-carbonates, hydroxides, phosphates, molybdates, tungstates, oxides, or mixtures thereof, are preferred, with hydroxy-carbonates and carbonates being most preferred. Generally, the molar ratio between the hydroxy groups and the carbonate groups in the hydroxy-carbonate lies in the range of 0-4, preferably 0-2, more preferably 0-1 and most preferably 0.1-0.8.

If the protic liquid is water, suitable Group VIB metal components which are at least partly in the solid state during contacting comprise Group VIB metal components with a low solubility in water, such as di- and trioxides, carbides, nitrides, aluminium salts, acids, or mixtures thereof. Preferred Group VIB metal components which are at least partly in the solid state during contacting are di- and trioxides, acids, and mixtures thereof. Suitable molybdenum components include molybdenum di- and trioxide, molybdenum carbide, molybdenum nitride, aluminium molybdate, molybdic acids (e.g. $H_2MoO_4$), ammonium phosphomolybdate, or mixtures thereof, with molybdic acid and molybdenum di- and trioxide being preferred. Suitable tungsten components include tungsten di- and trioxide, tungsten carbide, ortho-tungstic acid ($H_2WO_4*H_2O$), tungsten nitride, aluminium tungstate (also meta- or polytungstate), ammonium phosphotungstate, or mixtures thereof, with ortho-tungstic acid and tungsten di- and trioxide being preferred.

If the protic liquid is water, suitable Group V metal components which are at least partly in the solid state during the process of the invention comprise Group V metal components with a low solubility in water such as oxides, silicides, phosphides, and borides.

It should be noted that it is well within the scope of the skilled person to select suitable soluble or insoluble compounds, as the case may require, in the preparation of the bulk metal catalysts used herein.

In the context of the present specification, the material that will be at least partly in the solid state during the entire process has a solubility of less than 0.05 mol/100 ml solvent (18° C.). Also, it should be noted that if so desired, a material selected from the group of binder materials, conventional hydroprocessing catalysts, cracking components, or mixtures thereof can be added prior to, during the combining and reacting of the metal components and/or subsequent thereto. These materials will be designated as "carrier materials" below.

The carrier material can be added prior to the contacting of the metal components by, for example, combining it with one or more but not all of the metal components or vice versa, and by subsequently combining the mixture with the not yet added metal components either simultaneously or successively. The carrier material can be added during the contacting of the metal components by, for example, simultaneously combining the carrier material and the metal components or first combining the metal components either simultaneously or successively and then adding the carrier material during the reaction of the combined metal components. The carrier material can also be added subsequent to the contacting of the metal components by, for example, adding it directly to the reaction mixture obtained after the reaction of the metal components or by adding it after any of the further process steps which will be discussed in detail below. Preferably, the carrier material is added subsequent to the contacting of the metal components. Optionally, the catalyst composition resulting after combining and reacting the metal components can be subjected to a solid-liquid separation before being composited with the carrier materials, for example, filtration. After solid-liquid separation, a washing step may be carried out. Further, it is possible to thermally treat the catalyst composition prior to its being composited with the carrier materials. The carrier materials can be added in any suitable form, e.g., in the dry state, either thermally treated or not, in the wetted and/or suspended state, as a filter cake, and/or as a solution.

Optionally, the process of preparing the bulk metal catalyst suitable for use herein may comprise the further process steps of spray-drying, (flash) drying, milling, kneading, slurry-mixing, dry or wet mixing, shaping, and/or calcining. Dry mixing means mixing the catalyst composition in the dry state with any of the above materials in the dry state. Wet mixing, for example, comprises mixing the wet filter cake comprising the catalyst composition and optionally any of the above materials as powders or wet filter cake to form a homogenous paste thereof. Shaping comprises, for example, extrusion, pelletizing, beading and/or spray-drying.

It is generally preferred that the process selected to prepare the catalysts used herein comprise a shaping step. The shaping step is preferably carried out after the combining and reacting of the metal components. If a carrier material is to be added in the process according to the invention, it is preferably added before the shaping step is carried out.

It should also be noted that, if so desired, the product resulting from the combining of the Group VIII metal component, the Group VIB metal component, and the Group V metal component may be submitted to a calcination step. This calcination step, if applied, will generally be carried out at a temperature of 100-600° C., more in particular 150-450° C., still more in particular 250-450° C. The calcination time generally varies from 0.5 to 48 hours. The calcination may be carried out in an inert gas such as nitrogen, or in an oxygen-containing gas, such as air or pure oxygen, optionally in the presence of steam. Preferably, the calcination is carried out in an oxygen-containing atmosphere.

As indicated above, it is preferred that sulfur is incorporated into the catalyst composition after combining the various metal components to form a product. There are various ways to do this. It is, e.g., possible to contact the catalyst with one or more of the sulfur compounds described above, e.g., by contacting the product with a sulfur-containing liquid. Such liquid may be the liquid form of a sulfur component. It may also be a solution of a sulfur compound. For elemental sulfur it is possible to incorporate the sulfur into the catalyst via melting or sublimation. It is also possible to sulfide the product in the gaseous phase by contacting it with a sulfur-containing gas like $H_2S$. Finally, it is also possible to sulfide the catalyst by contacting it with a sulfur-containing hydrocarbon feed, e.g., a hydrocarbon feed that has been spiked with a sulfur-containing compound such as dimethyldisulfide (DMDS). Depending on the method used, sulfiding, i.e., contacting the catalyst with a sulfur-containing compound, can be carried out in situ and/or ex situ. Contacting the product with a gaseous sulfur component such as $H_2S$ can be done ex situ or in situ. Contacting the product with a sulfur-containing hydrocarbon feed is preferably done in situ. Contacting the catalyst with elemental sulfur or with a liquid or dissolved sulfur compound as described above will generally be done ex situ. In this case it may be desired however, to subject the sulfur-containing material to an activation step with hydrogen as described above. The activation with hydrogen can be done ex situ or in situ. It should be noted that in the context of the present specification the indication in situ refers to a process carried out in the unit in which the catalyst will be eventually used in the hydroprocessing of hydrocarbon feeds. Conversely, ex situ refers to a process carried out not inside such unit.

Two preferred embodiments to prepare bulk metal catalysts suitable for use in the present process will be elucidated below.

A first embodiment is a process comprising the successive steps of combining the metal components in a protic liquid, optionally mixing the resulting product with a carrier material, shaping the resulting composition, e.g., by spray-drying or extrusion, optionally calcining the resulting composition, and combining the resulting product with a sulfur-containing compound. A more preferred version of this embodiment comprises the steps of combining and reacting the metal components in a protic liquid, isolating the reaction product, optionally mixing the resulting catalyst composition with a carrier material, shaping the resulting composition, e.g., by spray-drying or extrusion, calcining the resulting composition, and sulfiding the resulting material.

The contacting of the hydrocarbonaceous feedstream with the above-described hydroprocessing catalysts produces a reaction product comprising at least a vapor product and a liquid product. The vapor product typically comprises gaseous reaction products such as $H_2S$. The liquid product is typically the desired product from the hydroprocessing process chosen by the practitioner. For example, in one embodiment of the instant invention, the effective hydroprocessing conditions are effective hydrotreating conditions. The effective hydrotreating conditions are selected to be effective at removing at least a portion of the nitrogen and organically bound sulfur contaminants and hydrogenating at least a portion of said aromatics in the hydrocarbonaceous feedstream. Thus at least a liquid product having a lower concentration of aromatics and nitrogen and organically bound sulfur contaminants than the hydrocarbonaceous feedstream is produced.

In one embodiment of the present invention, the vapor product and the liquid product are separated, and the liquid product recovered. The method of separating the vapor product from the liquid product is not critical to the instant invention and can be accomplished by any means known to be effective at separating gaseous and liquid reaction products. For example, a stripping tower or reaction zone can be used to separate the vapor product from the liquid product. If the effective hydroprocessing conditions are hydrotreating conditions, the liquid product recovered will have a sulfur concentration lower than that of the hydrocarbonaceous feedstream, and will preferably have a sulfur level low enough to meet regulatory requirements imposed at the time of production.

The above description is directed to several embodiments of the present invention. Those skilled in the art will recognize that other embodiments that are equally effective could be devised for carrying out the spirit of this invention.

The following examples will illustrate the present invention, but are not meant to limit it in any fashion.

EXAMPLES

Example 1

Preparation of a Catalyst Containing Molybdenum, Vanadium, and Nickel

A catalyst composition was prepared as follows. 78 grams of nickel hydroxy-carbonate, 31 grams of $MoO_3$ and 21 grams of vanadium pentoxide were combined in an aqueous medium. The slurry was aged overnight at 90° C. under stirring. The resulting suspension was filtered and the wet filter cake mixed. During the mixing, the temperature was increased somewhat to reduce the water content of the mixture to obtain an extrudable mix. The mixture was then extruded, and the extrudates were dried at 120° C. and calcined at 300° C. The resulting material contained 27.3 wt. % of molybdenum, calculated as trioxide, 20.4 wt. % of vanadium, calculated as vanadium pentoxide, and 52.2 wt. % of nickel, calculated as oxide. The Mo:V:Ni molar ratio in the end product was 0.27:0.33:1.

Example 2

Preparation of a Catalyst Containing Tungsten, Vanadium, and Nickel

A catalyst composition was prepared from 65 grams of nickel hydroxy-carbonate, 18 grams of vanadium pentoxide, and 45 grams of tungstic acid in a manner analogous to that described in Example 1 above. The resulting material contained 29 wt. % of tungsten, calculated as trioxide, 18.4 wt. % of vanadium, calculated as vanadium pentoxide, and 50.9 wt. % of nickel, calculated as oxide. The W:V:Ni molar ratio in the end product is 0.18:0.30:1.

Example 3

Preparation of a Catalyst Containing Molybdenum, Niobium, and Nickel

A catalyst composition was prepared from 72 grams of nickel hydroxy-carbonate, 32 grams of $Nb_2O_5.3H_2O$, and 29 grams of molybdenum trioxide in a manner analogous to that described in Example 1 above. The resulting material contained 29.8 wt. % of molybdenum, calculated as trioxide, 26.0 wt. % of niobium, calculated as niobium pentoxide, and 45 wt. % of nickel, calculated as oxide. The Mo:Nb:Ni molar ratio in the end product was 0.34:0.33:1.

Example 4

Preparation of a Catalyst Containing Tungsten, Niobium, and Nickel

A catalyst composition was prepared from 61 grams of nickel hydroxy-carbonate, 27 grams of $Nb_2O_5.3H_2O$, and 42 grams of tungstic acid in a manner analogous to that described in Example 1 above. The resulting material contained 39.5 wt. % of tungsten, calculated as trioxide, 22.6 wt. % of niobium, calculated as niobium pentoxide, and 38.7 wt. % of nickel, calculated as oxide. The W:Nb:Ni molar ratio in the end product was 0.32:0.33:1.

Example 5

Testing

The above catalysts were tested in an upflow tubular reactor. Each reactor tube contained 10 ml of catalyst mixed with an equal amount of SiC particles and sandwiched between layers of SiC particles.

Before being tested the catalysts were presulfided via liquid phase presulfiding using the feed described below which had been spiked with dimethyl disulfide to a total sulfur content of 3.7 wt. %. The presulfided catalysts were then tested in the hydrotreating of a diesel feedstock having the following properties:

| | |
|---|---|
| S (wt. %) | 1.2 |
| N (ppmwt) | 84 |
| total aromatics (wt. %) | 27.8 |
| polynuclear aromatic (PNA) (wt. %) | 11.7 |
| mono-aromatics (wt. %) | 16.5 |
| di-aromatics (wt. %) | 10.8 |
| tri+-aromatics (wt. %) | 0.8 |
| Simulated distillation ASTM-D 86 | |
| Initial boiling point | 184° C. |
| 5 vol.% | 218° C. |
| 10 vol. % | 231° C. |
| 30 vol. % | 265° C. |
| 50 vol. % | 287° C. |
| 70 vol. % | 310° C. |
| 90 vol. % | 345° C. |
| Final boiling point | 374° C. |

The catalysts were tested under two conditions:

| | Condition 1 | Condition 2 |
|---|---|---|
| temperature (° C.) | 330 | 340 |
| pressure (bar) | 40 | 20 |
| H2 to oil ratio (Nl/l) | 300 | 300 |
| LHSV (1/h) | 1.17 | 0.88 |

The test results are given in the following table:

TABLE

| | NiMoV Example 1 | NiWV Example 2 | NiMoNb Example 3 | NiVNb Example 4 |
|---|---|---|---|---|
| Condition 1 | | | | |
| product S (ppm) | 27 | 31 | 19 | 26 |
| product N (ppm) | 1.7 | 1.2 | 1.7 | 1.8 |
| total aromatics (wt. %) | 20.0 | 18.7 | 16.9 | 14.8 |
| polynuclear aromatic (wt. %) | 0.9 | 1.0 | 0.4 | 0.7 |
| mono-aromatics (wt. %) | 19.1 | 17.7 | 16.5 | 14.1 |
| di-aromatics (wt. %) | 0.9 | 1.0 | 0.4 | 0.6 |
| tri+-aromatics (wt. %) | 0 | 0 | 0 | 0.1 |
| Condition 2 | | | | |
| product S (ppm) | 563 | 424 | 72 | 72 |
| product N (ppm) | 17.1 | 16.5 | 2.0 | 4.7 |
| total aromatics (wt. %) | 26.6 | 26.4 | 25.4 | 24.9 |
| polynuclear aromatic (wt. %) | 4.2 | 4.3 | 2.1 | 4.0 |
| mono-aromatics (wt. %) | 22.4 | 22.1 | 23.3 | 20.9 |
| di-aromatics (wt. %) | 4.0 | 4.1 | 2.0 | 3.6 |
| tri+-aromatics (wt. %) | 0.2 | 0.2 | 0.1 | 0.4 |

The above results show that the catalysts used in the present invention provide for a process that is highly active in sulfur and nitrogen removal. Additionally, the decrease in polynuclear aromatics and diaromatics is particularly striking.

The invention claimed is:

1. A process for producing liquid products from a hydrocarbonaceous feedstream comprising:
   a) contacting a hydrocarbonaceous boiling range feedstream containing aromatics, nitrogen and organically bound sulfur contaminants in a reaction stage with a bulk metal hydroprocessing catalyst in the presence of hydrogen-containing treat gas thereby producing a reaction product comprising at least a vapor product and a liquid product, wherein said hydrocarbonaceous feedstream is contacted with said bulk metal catalyst under effective hydroprocessing conditions and said bulk metal hydroprocessing catalyst comprises:
      i) a single Group VIB metal component selected from molybdenum and tungsten;
      ii) a Group V metal component selected from vanadium, niobium, tantalum, and mixtures thereof; and
      iii) a Group VIII metal component selected from nickel, cobalt, iron, and mixtures thereof, wherein the metal components (calculated as oxides) comprise at least 50 wt. % of the catalyst, wherein the metal components are present in a ratio defined as (Group VIB+Group V):(Group VIII) such that said ratio, based on oxide forms of the metal components, is from 0.35:1 to 2:1.

2. The process according to claim 1 wherein said hydrocarbonaceous feedstream boils within 40° C. to about 1000° C.

3. The process according to claim 1 wherein said reaction stage comprises one or more reactors or reaction zones each of which can comprise one or more catalyst beds selected from the group consisting of fluidized beds, ebullating beds, slurry beds, fixed beds, and moving beds wherein each of said one or more catalyst beds contains a catalyst suitable for the reaction zone in which the catalyst bed is located.

4. The process according to claim 3 wherein said reaction stage comprises one or more fixed catalyst beds.

5. The process according to claim 3 wherein said process further comprises cooling between catalyst beds, reactors, or reaction zones in said reaction stage.

6. The process according to claim 3 wherein said hydroprocessing process is selected from at least one of hydroconversion, hydrocracking, hydrotreating, hydrogenation, hydroisomerization, catalytic dewaxing, demetallation, ring-opening, and mixtures thereof.

7. The process according to claim 6 wherein said hydroprocessing process is selected from hydrotreating, hydrogenation and mixtures thereof.

8. The process according to claim 1 wherein said bulk metal hydroprocessing catalyst has a ratio between the total molar amount of Group VIB and Group V metals and the molar amount of Group VIII metal of at least 0.6:1.

9. The process according to claim 1 wherein the metal components of said bulk metal hydroprocessing catalyst make up at least 80 wt. % of the catalyst composition, calculated as oxides.

10. The process according to claim 1 wherein the metal components of said bulk metal hydroprocessing catalyst make up at least 90 wt. % of the catalyst composition, calculated as oxides.

11. The process according to claim 1 wherein vanadium and/or niobium make up at least 50 mole % of the total of Group V metal components.

12. The process according to claim 1 wherein vanadium and/or niobium make up at least 90 mole % of the total of Group V metal components.

13. The process according to claim 1 wherein vanadium and/or niobium make up substantially all of the Group V metal components.

14. The process according to claim 1 wherein cobalt and nickel make up at least 50 mole % of the total of Group VIII metal components.

15. The process according to claim 1 wherein cobalt and nickel make up at least 90 mole % of the total of Group VIII metal components.

16. The process according to claim 1 wherein cobalt and nickel make up substantially all of the Group VIII metal components.

17. The process according to claim 13, wherein nickel makes up substantially all of the Group VIII metal components.

18. The process according to claim 1 wherein said hulk metal hydroprocessing catalyst is formed by a process which comprises combining, sequentially, or simultaneously, a Group VIB metal component selected from molybdenum and tungsten, a Group V metal component selected from vanadium, niobium, tantalum, and mixtures thereof, a Group VIII metal component selected from nickel, cobalt, iron, and mixtures thereof, and a sulfur compound.

19. The process according to claim 18 wherein said catalyst forming process involves combining, in a first step, a Group VIB metal component, a Group V metal component and a Group VIII metal component to form an oxygen-stable product and said oxygen stable product is combined with a sulfur compound in a second step.

20. The process according to claim 19 wherein said catalyst forming process wherein the second step of combining the resulting oxygen-stable product with a sulfur compound further includes a sulfidation step wherein at least part of the metal components of the hulk metal hydroprocessing catalyst are converted into their respective sulfides.

21. The process according to claim 1 wherein said process further comprises:
  b) separating said vapor product from said liquid product; and
  c) recovering said liquid product.

22. The process according to claim 7 wherein said effective hydroprocessing conditions are effective hydrotreating conditions selected in such a manner that at least a portion of said nitrogen and organically bound sulfur contaminants are removed from said hydrocarbonaceous feedstream and at least a portion of said aromatics are hydrogenated.

23. The process according to claim 21 wherein said liquid product has a sulfur, nitrogen, and aromatics concentration lower than said hydrocarbonaceous feedstream.

24. The process according to claim 22 wherein said effective hydroprocessing conditions comprise temperatures ranging from about 150° C. to about 425° C., weight hourly space velocities ranging from about 0.1 to about 20 hr$^{-1}$, and pressures ranging from about 4 to about 70 atmospheres.

25. The process according to claim 1 wherein the nitrogen content of said hydrocarbonaceous feedstream is about 50 to about 1000 wppm nitrogen, the sulfur content of the hydrocarbonaceous feedstream ranges from about 50 wppm to about 7000 wppm, and the aromatics content ranges from about 0.05 wt. % to about 2.5 wt. %, all based on the hydrocarbonaceous feedstream.

26. The process according to claim 2 wherein said hydrocarbonaceous feedstream is selected from vacuum gas oils; distillates including naphtha, diesel, kerosene, and jet fuel; heavy gas oils, raffinates, and lube oils.

27. The process according to claim 1 wherein said hulk metal hydroprocessing catalyst has a ratio between the total molar amount of Group VIB and Group V metals and the molar amount of Group VIII metal of at least 0.75:1.

28. The process according to claim 1 wherein said bulk metal hydroprocessing catalyst has a ratio between the total molar amount of Group VIB and Group V metals and the molar amount of Group VIII metal of at most 1.5:1.

29. The process according to claim 1, wherein:
  vanadium and/or niobium make up substantially all of the Group V metal components;
  cobalt and/or nickel make up substantially all of the Group VIII metal components;
  the Group VIB metal component is selected from molybdenum and tungsten;
  the Group V metal components, the Group VIII metal components, and the Group VIB metal component constitute at least 90 wt % of the bulk hydroprocessing catalyst, as measured in oxide form before sulfidization;
  the effective hydroprocessing conditions comprise temperatures ranging from about 150° C. to about 425° C., weight hourly space velocities ranging from about 0.1 to about 20 hr$^{-1}$, and pressures ranging from about 4 to about 70 atmospheres, and result in the liquid product having less than 100 wppm sulfur heteroatom content;
  the (Group VIB+Group V):(Group VIII) ratio is from 0.48:1 to 0.67:1;
  the bulk metal hydroprocessing catalyst exhibits a metals ratio of (Group VIB):(Group V), based on oxide forms of the metals, from 3:1 to 1:3; and
  the bulk metal hydroprocessing catalyst further comprises sulfur, at least partly in metal sulfide form, such that the bulk metal hydroprocessing catalyst exhibits a sulfur content from 8 wt % to less than 70 wt %.

30. The process of claim 29, wherein the effective hydroprocessing conditions result in the liquid product having less than 10 wppm nitrogen heteroatom content, less than 25.5 wt % total aromatics content, less than 4.0 wt % di-aromatics content, and 4.0 wt % or less polynuclear aromatics content.

* * * * *